US010839717B2

(12) United States Patent
Albrecht

(10) Patent No.: US 10,839,717 B2
(45) Date of Patent: Nov. 17, 2020

(54) WELD TRAINING SYSTEMS TO SYNCHRONIZE WELD DATA FOR PRESENTATION

(71) Applicant: ILLINOIS TOOL WORKS INC., Glenview, IL (US)

(72) Inventor: Bruce Albrecht, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 492 days.

(21) Appl. No.: 15/399,518

(22) Filed: Jan. 5, 2017

(65) Prior Publication Data

US 2017/0200394 A1 Jul. 13, 2017

Related U.S. Application Data

(60) Provisional application No. 62/277,307, filed on Jan. 11, 2016.

(51) Int. Cl.
*G09B 19/24* (2006.01)
*G09B 9/00* (2006.01)
*B23K 9/095* (2006.01)

(52) U.S. Cl.
CPC ............. *G09B 19/24* (2013.01); *G09B 9/00* (2013.01); *B23K 9/095* (2013.01); *B23K 9/0953* (2013.01); *B23K 9/0956* (2013.01)

(58) Field of Classification Search
CPC .... B23K 9/095; B23K 9/0953; B23K 9/0956; G09B 19/24
See application file for complete search history.

(56) References Cited

U.S. PATENT DOCUMENTS 5,850,352 A * 12/1998 Moezzi ................ H04N 13/139
345/419
6,144,375 A * 11/2000 Jain ...................... G11B 27/105
715/251

(Continued)

FOREIGN PATENT DOCUMENTS

CN 102378666 3/2012
CN 102523423 6/2012

(Continued)

OTHER PUBLICATIONS

Int'l Search Report and Written Opinion for Appln No. PCT/US2017/012471 dated Mar. 30, 2017 (14 pages).
Examiner's Requisition CA Appln. No. 3,011,056 (4 pgs.).

*Primary Examiner* — Robert J Utama
(74) *Attorney, Agent, or Firm* — McAdnrews, Held & Malloy, Ltd.

(57) ABSTRACT

Synchronized weld training systems are disclosed. Example systems include a display device; a processor to execute instructions to: collect, from welding-type equipment during a welding-type operation, data describing the operation; collect, from a set of one or more cameras, first images of an operator, the first images depicting a posture or technique of the operator; collect, from the set of cameras, second images of a welding torch; collect third images of a weld bead; synchronize the data, and the first, second, and third images; display the data and the first, second, and third images; and, after the operation and in response to an input specifying a portion of the welding-type operation, display corresponding synchronized portions of the data and the first, second, and third images to present a relationship between the posture, a position of the welding torch, and the data to the weld bead.

22 Claims, 8 Drawing Sheets

(56) References Cited

U.S. PATENT DOCUMENTS

| | | | |
|---|---|---|---|
| 7,199,820 B2 * | 4/2007 | Oka | H04N 5/073 348/14.09 |
| 8,851,896 B2 * | 10/2014 | Wallace | G09B 5/00 434/234 |
| 9,101,994 B2 | 8/2015 | Albrecht | |
| 9,975,196 B2 * | 5/2018 | Zhang | G01C 21/16 |
| 2002/0064764 A1 | 5/2002 | Fishman | |
| 2003/0001950 A1 * | 1/2003 | Eriksson | A61F 9/06 348/61 |
| 2009/0231423 A1 * | 9/2009 | Becker | A61F 9/06 348/82 |
| 2009/0298024 A1 | 12/2009 | Batzler | |
| 2010/0173732 A1 * | 7/2010 | Vaniche | A63B 24/0003 473/422 |
| 2011/0050878 A1 * | 3/2011 | Wells | H04N 7/181 348/86 |
| 2011/0117527 A1 * | 5/2011 | Conrardy | B23K 9/0956 434/234 |
| 2011/0316516 A1 * | 12/2011 | Schiefermuller | A61F 9/06 323/318 |
| 2012/0180180 A1 * | 7/2012 | Steve | A61F 9/067 2/12 |
| 2013/0209976 A1 | 8/2013 | Postlethwaite | |
| 2013/0288211 A1 | 10/2013 | Patterson | |
| 2014/0004487 A1 * | 1/2014 | Cheben | G06F 3/011 434/219 |
| 2014/0134579 A1 | 5/2014 | Becker | |
| 2014/0134580 A1 | 5/2014 | Becker | |
| 2014/0263224 A1 | 9/2014 | Becker | |
| 2014/0272835 A1 | 9/2014 | Becker | |
| 2014/0272836 A1 | 9/2014 | Becker | |
| 2014/0272837 A1 | 9/2014 | Becker | |
| 2014/0272838 A1 * | 9/2014 | Becker | G09B 19/24 434/234 |
| 2014/0315167 A1 * | 10/2014 | Kreindl | G09B 19/24 434/234 |
| 2015/0154884 A1 | 6/2015 | Salsich | |
| 2015/0190875 A1 | 7/2015 | Becker | |
| 2015/0190876 A1 | 7/2015 | Becker | |
| 2015/0190887 A1 | 7/2015 | Becker | |
| 2015/0190888 A1 | 7/2015 | Becker | |
| 2015/0194072 A1 | 7/2015 | Becker | |
| 2015/0194073 A1 | 7/2015 | Becker | |
| 2015/0325153 A1 | 11/2015 | Albrecht | |
| 2015/0375324 A1 | 12/2015 | Becker | |
| 2015/0375327 A1 | 12/2015 | Becker | |
| 2015/0379894 A1 | 12/2015 | Becker | |
| 2016/0039034 A1 | 2/2016 | Becker | |
| 2016/0049085 A1 | 2/2016 | Beeson | |
| 2016/0093233 A1 * | 3/2016 | Boulware | B23K 9/0026 219/136 |
| 2016/0267806 A1 * | 9/2016 | Hsu | G09B 19/24 |
| 2017/0200394 A1 * | 7/2017 | Albrecht | G09B 19/24 |
| 2018/0053438 A1 * | 2/2018 | Moriguchi | G09B 9/00 |
| 2018/0130377 A1 * | 5/2018 | Meess | B23K 9/1093 |

FOREIGN PATENT DOCUMENTS

| | | | |
|---|---|---|---|
| CN | 103077640 | 5/2013 | |
| CN | 104112388 | 10/2014 | |
| CN | 104708174 | 6/2015 | |
| CN | 105051801 | 11/2015 | |
| CN | 105190724 | 12/2015 | |
| WO | WO-2013061518 A1 * | 5/2013 | B23K 9/167 |
| WO | 2014140720 | 9/2014 | |

* cited by examiner

WELD TRAINING SYSTEMS TO SYNCHRONIZE WELD DATA FOR PRESENTATION

RELATED APPLICATIONS

This patent claims priority to U.S. Provisional Patent Application Ser. No. 62/277,307, filed Jan. 11, 2016, entitled "Synchronized Weld Training System." The entirety of U.S. Provisional Patent Application Ser. No. 62/277,307 is incorporated herein by reference.

BACKGROUND

This disclosure relates generally to weld training and, more specifically, to weld training systems to synchronize weld data for presentation.

Welding often involves the balancing of multiple factors to achieve a consistent weld result. While training weld operators, certain feedback information is often difficult to provide to the weld operator during or after a weld. Additionally, weld operators being trained can often benefit from visualizations of specific factors that affect weld quality. Further limitations and disadvantages of conventional approaches to welding will become apparent to one of skill in the art, through comparison of such approaches with some aspects of the present method and system set forth in the remainder of this disclosure with reference to the drawings.

SUMMARY

Methods and systems are provided for a synchronized weld training system, substantially as illustrated by and/or described in connection with at least one of the figures, as set forth more completely in the claims.

DETAILED DESCRIPTION

Figure 1:
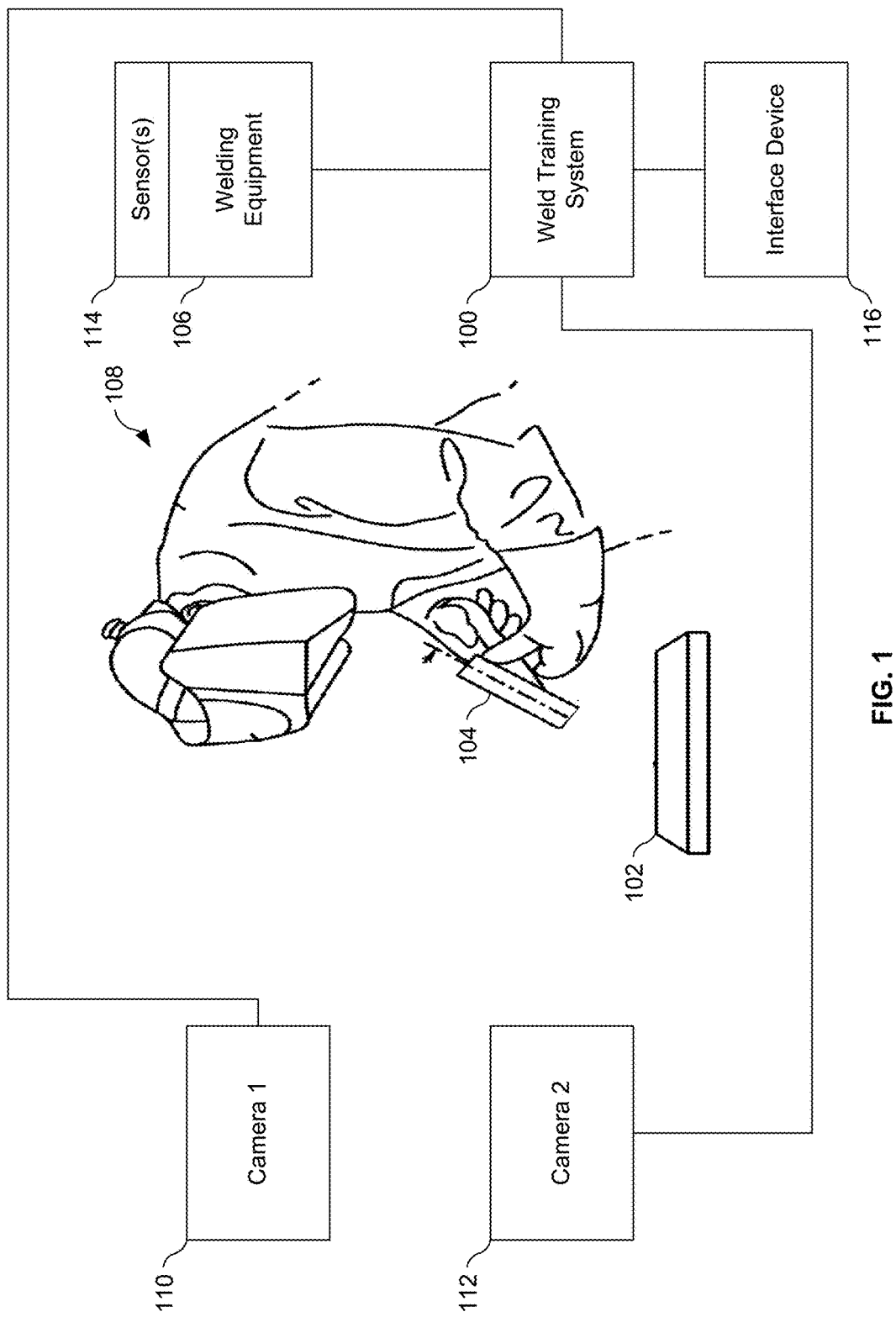
FIG. 1 illustrates an example weld training system configured to collect and/or render weld data and/or images before, during, and after welding operations.

Allowing a weld operator to view graphs and/or videos on a single screen will improve learning for weld operators. Training can also be improved by synchronizing video (e.g., sequences of images which may also include audio) to graphs of relevant data to show the data and the videos that occurred at the same time. Example videos can show torch angles, operator posture, contact-tip-to-work distances, and/or weld speed for multiple viewpoints. Additionally, in some examples the synchronized videos and/or graphs of the operator's monitored performance can be overlaid with comparative images or views indicative of "correct" or "expert" performance of the target weld operation. The videos and/or graphs can be manipulated by the user to view and/or focus on torch angles, operator posture, contact-tip-to-work distances, and/or weld speed, and/or the effects of those aspects, for the entirety of the weld operation.

Disclosed examples utilize a user interface that displays and synchronizes various welding operation data, such as training views, a weld operator's posture, and welding parameters with weld bead imagery to provide enhanced playback and analysis of a welding operation and resultant weld bead, whether a real world or simulated welding operation. The welding operation data may be synchronized with the weld bead such that a user can select a point along the weld bead to reveal various welding operation data at that point in time (i.e., when the selected portion of the weld bead was created). The welding operation data may be displayed in real-time during the welding operation and/or recorded for later playback.

Disclosed weld training user interfaces collect, display, and synchronize various welding operation data (e.g., training views, a weld operator's posture, and welding parameters) with a weld bead imagery to provide analysis of a welding operation and weld bead. The weld training user interface employs one or more sensors, which may be integrated with headwear or elsewhere in the welding area. The welding operation data may be displayed in real-time during the welding operation and/or recorded for later playback.

As used herein, the term welding-type equipment refers to welding equipment capable of performing an actual weld, welding equipment that has been rendered incapable of performing welds, and/or simulated/non-welding equipment, and/or any combination thereof.

As used herein, the term "welding-type operation" refers to an actual weld, a simulation of a weld using equipment capable of performing an actual weld, a simulation of a weld using welding equipment that has been rendered incapable of performing welds, and/or a simulation of a weld using simulated or non-welding equipment.

As used herein, the term "posture" refers to a position of a weld operator's body.

As used herein, the term "technique" refers to active actions taken by a weld operator, such as torch angle and travel speed, and passive actions taken by the operator, such as support and stability of the operator's actions.

As used herein, the term weld torch position information includes a torch position with respect to, for example, the weld bead or workpiece. The torch position may be determined using any known techniques of torch tracking, by sensors, edge detection, pattern recognition, helmet and torch sensors, relative determinations, an angle sensor on operator's forearm, etc.

While some examples are described below with reference to weld training, disclosed systems and methods may also be used for monitoring actual welding jobs. For example, disclosed systems and methods may be used to capture exemplary welds for later use, to provide documentation for later review or root cause failure analysis in the event of a failure of the product being welded, and/or for any other monitoring purpose.

Some example weld training systems include a display device, a processor, and a machine readable storage device comprising machine readable instructions. The instructions, when executed, cause the processor to: collect, from welding-type equipment during a welding-type operation, data describing the welding-type operation. The instructions further cause the processor to collect, from a set of one or more cameras, first images of an operator performing the welding-type operation, the first images depicting a posture of the operator or a technique of the operator, and to collect, from the set of one or more cameras, second images of a welding torch used in the welding-type operation. The instructions further cause the processor to collect third images of a weld bead generated by the welding-type operation, synchronize the data, the first images, the second images, and the third images, and display the data, the first images, the second images, and the third images. The instructions also cause the processor to, after the welding-type operation and in response to an input specifying a portion of the welding-type operation, display corresponding synchronized portions of the data, the first images, the second images, and the third images to present a relationship between the posture of the operator, a position of the welding torch, and the data to the weld bead.

In some example weld training systems, the welding-type operation is a simulated weld, and the third images of the weld bead are simulated images. In some examples, the welding-type operation is an actual weld. In some such examples, the third images of the weld bead are collected from the set of one or more cameras.

In some example weld training systems, the input is a selection of a time, a selection of the data, a selection of any of the first images, a selection of any of the second images, or a selection of any of the third images. In some examples, the instructions further cause the processor to capture audio from the welding-type operation. In some such examples, the input includes a selection of a portion of the audio.

In some examples, one or more of the first images, the second images, or the third images represents light wavelengths outside of the visible wavelength spectrum. In some examples, the instructions cause the processor to display the data in a graph. In some examples, the instructions cause the processor to associate the data to respective locations by determining locations of a weld puddle during the welding-type operation and associating the locations of the weld puddle to at least one of data points captured during the welding-type operation.

In some example weld training systems, the data describing the welding-type operation includes at least one of a weld variable, a physical weld parameter, or an electrical weld parameter. The instructions cause the processor to display a graph of the data, at least one axis of the graph corresponding to the weld bead. In some such examples, the weld variable is a weld voltage, a weld current, a contact-tip-to-work distance, an arc length, an energy input, a torch travel speed, a torch orientation, or a measured bead width. In some examples, the instructions cause the processor to display with the graph a range of acceptable values for the data in the graph, and the graph visually indicates any data points which are outside of the range of acceptable values.

In some examples, the instructions cause the processor to display the corresponding synchronized portions of the data, the first images, the second images, and the third images in a split-screen configuration on the display device. In some examples, the weld training system is integral with welding-type equipment. In some examples, the weld training system is to receive the data from the welding-type equipment via at least one of a wireless communication or a wired communication.

In some example weld training systems, the instructions further cause the processor to: store the data, the first images, the second images, and the third images in a storage device; associate the data and one or more of the first images, the second images, or the third images with at least one of an anomaly type or an anomaly cause; and, in response to a selection of the at least one of the anomaly type in the weld bead or the anomaly cause, display the data and the one or more of the first images, the second images, or the third images via the display device.

In some examples, the instructions further cause the processor to align and scale a representation of the data with at least one of the first image, the second images, or the third images on the display device. In some examples, the instructions cause the processor to display the corresponding synchronized portions of the data, the first images, the second images, and the third images in slow motion or at accelerated speed. In some example weld training systems, the instructions further cause the processor to provide one or more of the data, the first images, the second images, or the third images to a neural network to identify weld anomalies in the welding-type operation, and the instructions cause the processor to display the corresponding synchronized portions of the data, the first images, the second images, and the third images with identifiers to indicate the weld anomalies identified by the neural network.

In some examples, the instructions further cause the processor to: collect weld torch position information during the welding-type operation; synchronize the weld torch position information to one or more of the data, the first images, the second images, or the third images; and, after the welding-type operation, determine the position of the welding torch with respect to the weld bead to determine the portion of the welding-type operation to be displayed via the data, the first images, the second images, or the third images. In some example weld training systems, the corresponding synchronized portions of the data, the first images, the second images, and the third images represent a time period during which specified portion of the welding-type operation occurred.

Disclosed example weld training systems include a display device, a processor, and a machine readable storage device comprising machine readable instructions. The instructions, when executed, cause the processor to: collect, from welding-type equipment during a welding-type operation, data describing the welding-type operation. The instructions further cause the processor to collect, from a set of one or more cameras, images depicting two or more of: a) a posture of the operator or a technique of the operator during the welding-type operation; b) a welding torch used in the welding-type operation; or c) a weld bead generated by the welding-type operation. The instructions further cause the processor to synchronize the collected data and the collected images, and display the collected data and the collected images together in a synchronized manner on the display device such that the processor updates the display device to display corresponding synchronized data and images when a portion of the welding-type operation is selected for viewing.

In some examples, the processor collects, from the set of one or more cameras, images depicting two or more of: a) the posture of the operator or the technique of the operator during the welding-type operation; b) the welding torch used in the welding-type operation; or c) a weld bead generated by the welding-type operation. In some examples, the processor processes the collected data to generate a representation of the weld bead generated by the welding-type operation. In some such examples, the processor displays the collected data by displaying the representation of the weld bead generated by the welding-type operation.

FIG. 1 illustrates an example weld training system 100 configured to collect and/or render weld data and/or images before, during, and after welding operations. The example weld training system 100 collects weld data and images, synchronizes the weld data and the images, and presents the synchronized weld data and images for weld training.

As shown in FIG. 1, a weld operator 108 holds a weld torch 104 to perform a welding-type operation on a physical work piece 102 with the torch 104. As illustrated, the weld operator 108 may be a human operator, but disclosed examples may be applied to robotic welding (e.g., recording and playback of the welding operation). The torch 104 is coupled to welding equipment 106, such as a power supply and/or wire feeder. The weld training system 100 may be integral to the welding equipment. Alternatively, the weld training system 100 may be separate from the welding equipment 106 and the weld training system 100 receives weld data from the welding equipment 106 via a wireless communication and/or a wired communication.

The example weld training system 100 receives images of the welding-type operation from cameras 110, 112. The weld training system 100 also receives weld data from the welding equipment 106. The example welding equipment 106 includes and/or is coupled to one or more sensor(s) 114. The welding-type operation may be a simulated weld or an actual weld. When the weld is a simulated weld, the images of the weld bead may be simulated images. When the weld is an actual weld, the images of the weld bead may be collected via another camera.

The welding torch 104 may be a real world welding torch or a mock welding torch. For example, augmented reality welding may be used in connection with real world welding (i.e., an arc is formed) or simulated welding, where the weld operator 108 manipulates mock welding tools and/or coupons while the arc and weld bead are simulated via a display. Data, welding parameters, scores, and/or other guidance may be presented in conjunction with the image(s) (e.g., video(s)) of the welding operator, the weld bead, and/or the welding torch.

The sensor(s) 114 and/or the cameras 110, 112 may be used to collect weld torch position information during the welding-type operation. The weld training system 100 synchronizes the weld torch position information to the data, the first images, the second images, and/or the third images and, after the welding-type operation, determines the position of the welding torch with respect to the weld bead to determine the input specifying the portion of the welding-type operation.

In some examples, the weld training system 100 is a computing system or server that collects data including measured welding data and/or images, processes the data and/or images, and presents the data and/or images via a display device for review by an operator or other system user. In another example implementation, the weld training system 100 may include a welding helmet with shell and auto-darkening lens and a display system (e.g., a mediated reality display, an augmented reality display, etc.) that can be viewed by the wearer of the helmet.

After the work piece 102 has been welded, the weld training system 100 may present a recording of the welding-type operation performed on the work piece 102 by the weld operator 108. The recording includes measured welding data, images, and/or any other information about the weld, which may be synchronized for simultaneous playback. The presentation enables the weld operator 108 (who may be the weld operator 108 who performed the weld or an instructor, inspector, or the like) to review the weld operation to, for example, inspect for possible quality issues.

As described in greater detail below, the weld operator 108 could, for example, select a portion of the completed weld bead via the weld training system 100 to cause the video to seek to the point of the recording at which the touched portion of the weld bead was laid down, and cause the weld training system 100 to display the various welding operation data (e.g., welding parameters, equipment settings, torch parameters, etc.) that were present at the time the selected portion of the weld bead was laid down and/or any other images captured at the same time the selected portion of the weld bead was laid down. For example, the weld training system 100 may further display the posture of the weld operator 108 at the selected point in time and/or the position and orientation of the weld torch 104 at the selected point in time. In some examples, the weld training system 100 may display a duration of time leading up to the selected point in time and/or a duration of time after the selected point in time. The corresponding synchronized portions of the data, the first images, the second images, and the third images may represent a time period during which specified portion of the welding-type operation occurred. Similarly, an instructor, who may be remotely situated, may select points on the weld bead (or a corresponding graph) to analyze the work of the weld operator 108 at a specific point during the welding operation. In certain aspects, a virtual torch can be animated together with the image of the actual weld torch 104 in the playback on the real seam to contrast the difference between desired torch orientation and actual torch orientation for improvement.

In another example scenario, the correspondence between measured weld data and the weld bead may be rendered and presented to the weld operator in real-time during welding operation of the work piece 102. For example, a graph and/or visual augmentation of the weld bead may present real-time visual feedback such as current torch angles, torch speed, contact tip to work distance, welding equipment settings, etc. during a welding operation. The weld training system 100, or another system embodying aspects of the present disclosure, may be further configured to display, monitor, and track, a Welding Procedure Specification (WPS), a Procedure Qualification Record (PQR), instructions for setting up a weld procedure, welding codes, applicable standard for review, curriculums, training videos, etc. The weld training system 100 may use the WPS, PQR, and/or any other information for identifying and displaying anomalies, weld parameter ranges and/or potential weld defects.

Figure 2:
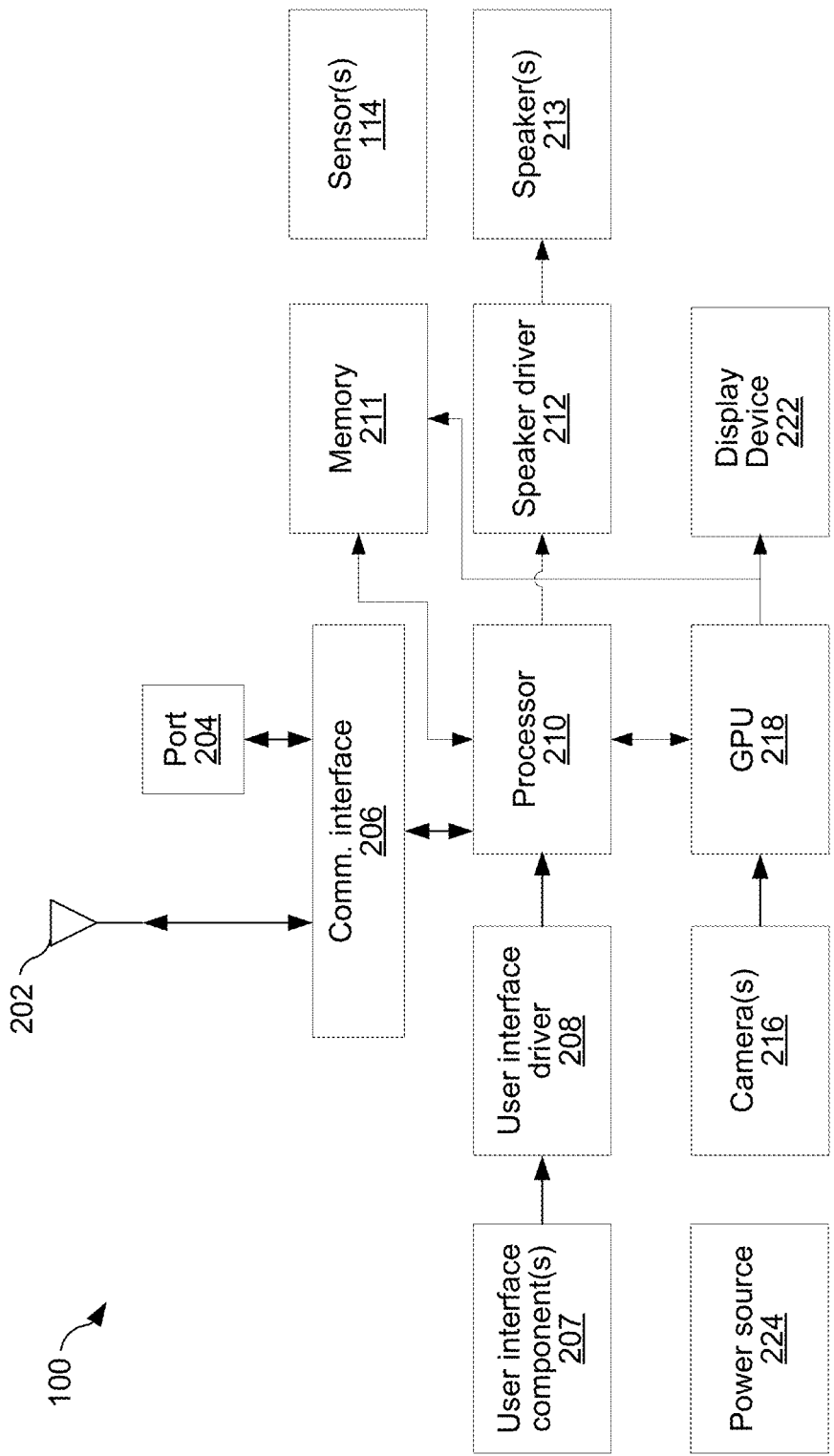
FIG. 2 illustrates an example implementation of the weld training system of FIG. 1.

Referring to FIG. 2, an example implementation of the weld training system 100 is shown. In the example implementation, the weld training system 100 comprises circuitry including: a display device 222, electromechanical user interface components 207, an antenna 202, a communication port 204, a communication interface 206, a user interface driver 208, a processor 210, a memory 211 or other machine readable storage device, speaker driver circuitry 212, speaker(s) 213, a graphics processing unit (GPU) and/or holographic processing unit (HPU) 218, power source 224, and/or one or more of the sensor(s) 114 such as Inertial Measurement Unit (IMU) sensors 114, microphones, and/or positional sensors useful in determining the weld operator's

108 posture. In examples in which the weld training system 100 is used in a traditional real world welding environment without augmented reality, any unnecessary components of the weld training system 100 may be omitted to reduce cost. For example, if the weld training system 100 is configured to only record images of the weld and welding parameters for playback, the GPU and/or HPU 218, display driver circuitry, etc. may be omitted.

Antenna 202 may be any type of antenna suited for the frequencies, power levels, etc. used for wireless communications (e.g., Wi-Fi, Bluetooth, Bluetooth Low Energy, Zigbee, and/or the like) between the weld training system 100 and other devices such as welding equipment, wireless base stations, phones, computers, etc.

Communication port 204 may comprise, for example, an Ethernet over twisted pair port, a USB port, an HDMI port, a passive optical network (PON) port, and/or any other suitable port for interfacing with a wired or optical cable via which the weld training system 100 may communicate with other devices such as welding equipment, wireless base stations, phones, computers, etc.

A communication interface 206 includes circuitry operable to interface the processor 210 to the antenna 202 and the port 204 for transmit and receive operations. For transmit operations, communication interface 206 receives data from the processor 210, and packetizes the data and converts the data to physical layer signals in accordance with protocols in use by a communication link. The data to be transmitted may comprise, for example, control signals for controlling the welding equipment. For receive operations, communication interface 206 receives physical layer signals via antenna 202 or port 204, recovers data from the received physical layer signals (demodulate, decode, etc.), and provides the data to the processor 210. The received data may comprise, for example, indications of current settings and/or actual measured output of welding equipment (e.g., voltage, amperage, and/or wire speed settings and/or measurements). Signals output to communication interface 206 may comprise, for example, signals to control the settings of welding equipment. Such signals may be generated based on signals from GPU 218 and/or the user interface driver 208. Signals from communication interface 206 comprise, for example, indications (received via antenna 202, for example) of current settings and/or actual measured output of welding equipment.

The electromechanical user interface components 207 may comprise, for example, one or more touchscreen elements, speakers, microphones, physical buttons, etc. that generate electric signals in response to user input. As described below, user interaction with the weld training system 100 may additionally, or alternatively, be through gestures captured by camera(s) 216 and detected through image processing algorithms performed by the GPU 218.

A user interface driver 208 includes circuitry operable to condition (e.g., amplify, digitize, etc.) signals from electromechanical user interface components 207 for conveyance to the processor 210.

The processor 210 is operable to process data from communication interface 206, user interface driver 208, and GPU 218, and to generate control and/or data signals to be output to speaker driver circuitry 212, GPU 218, and communication interface 206. The processor 210 may execute instructions stored in memory 211 and read and write data to and from memory 211. Any and/or all of the operations and/or functions of the weld training system 100 disclosed herein may be implemented by the processor executing the instructions stored on a non-transitory machine readable medium such as the memory 211.

Speaker driver circuitry 212 is operable to condition (e.g., convert to analog, amplify, etc.) signals from the processor 210 for output to one or more speakers 213.

The power source 224 may comprise, for example, a battery, circuitry for charging the battery from an AC and/or DC power source, and circuitry for conditioning/delivering energy from the battery to the other circuitry of the weld training system 100.

In an example implementation, the camera(s) may be based on time-of-flight (ToF) distance measurement camera, illuminating the scene with an actively modulated light source such as laser or light pulse and measuring the phase shift between the illumination and reflection, and/or time-of-flight of a light signal between the camera and the subject for each point of the image (a class of scannerless LIDAR). In this type of camera, the entire scene is captured at once. In another example implementation, the camera(s) 216 may be a 3D laser scanner or structured light, which may be used to scan objects and produce a 3D drawing or model, often used for reverse engineering of a physical component/part. Yet another example implementation is two cameras spaced apart to provide stereo vision and depth perception with more complex image processing and possibly slower frame rate. The camera(s) 216 may provide, for example, sub-millimeter depth accuracy and 160 fps (or higher) frame rate. Since the depth measurement is extracted from phase shift for ToF, the intensity contrast between the arc and the surrounding may have less effect on the measurement than when using structured light. The camera(s) 216 may be integrated with the weld training system 100 or, in certain aspects, elsewhere in the welding work station. For example, one or more camera(s) 216 may be positioned adjacent the work piece 102 and configured to provide a line of sight to the work piece 102 (e.g., mounted to a workbench or work piece 102).

Graphics processing unit (GPU) 218 is operable to process pixel data. This includes processing of pixel data from camera(s) 216 and the generation of pixel data for output to the display device 222 via a display driver. Processing of pixel data from camera(s) 216 may comprise, for example, analyzing the pixel data to detect gestures, position, and the like of a weld operator, detecting qualities of a weld bead, and/or determine an orientation of a weld torch. Generation of pixel data for output to the display driver may comprise, for example, rendering image data (3D CAD drawings, comprising text, graphics, still photos, and/or videos) retrieved from memory 211.

Where applicable, a display device 222 may comprise, for example, a liquid crystal display, an organic LED (OLED) display, and/or any other suitable type of display operable to convert electrical signals into optical signals viewable by a user of the weld training system 100.

The sensor(s) 114 may comprise, for example, photodiode, infrared and/or ultrasonic telemeters, accelerometers, gyroscopes, magnetometers, and/or the like. The sensor(s) 114 may, for example, be operable to track head and body movement of the weld operator 108.

In various other example implementations, the circuitry depicted as part of the weld training system 100 may reside in any combination of the weld training system 100, the welding equipment, a remote computer, and/or any other devices electrically and/or communicatively coupled to the weld training system 100. For example, the GPU 218, or portions thereof, may reside in the remote computer or welding equipment.

Figure 3:
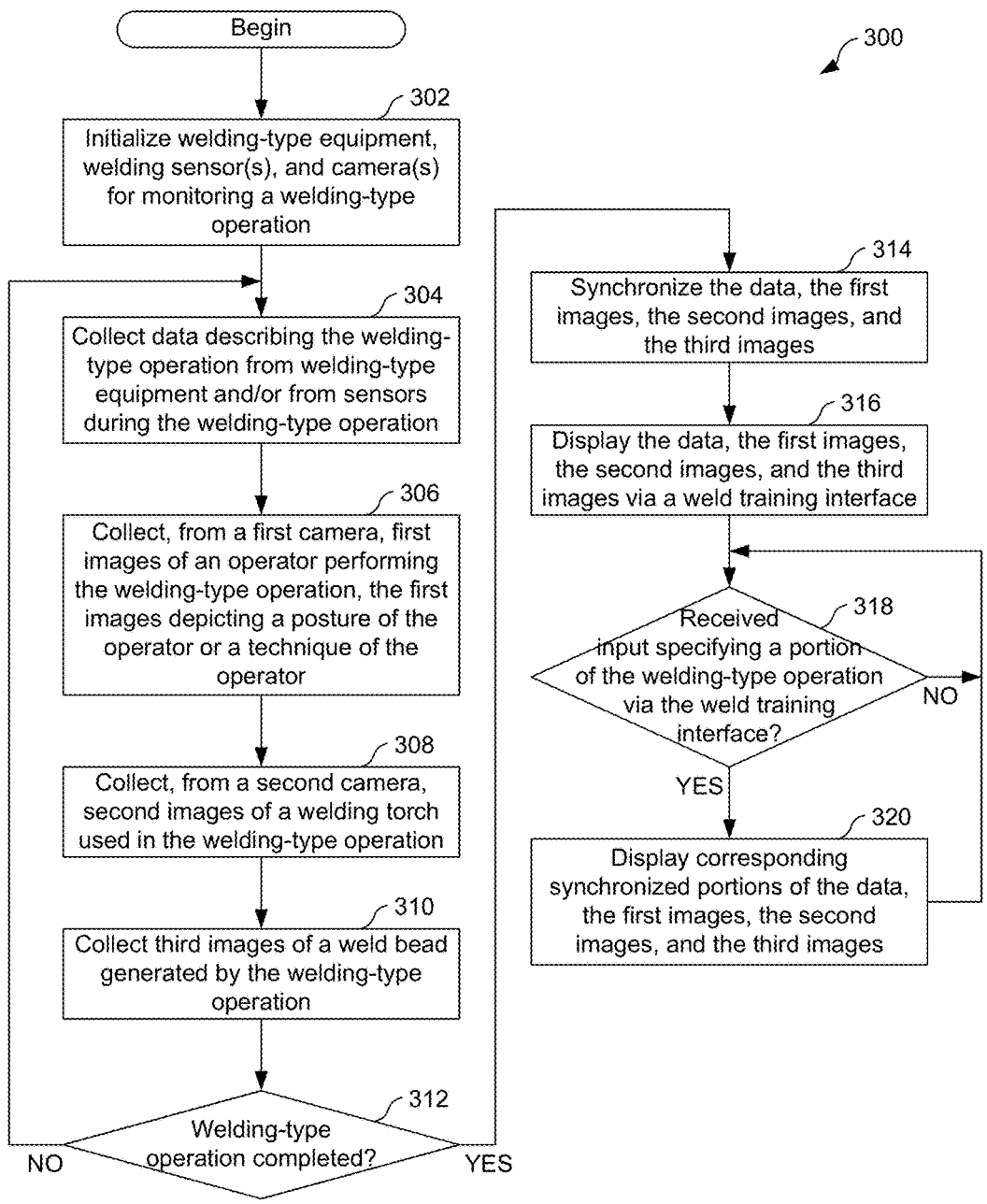
FIG. 3 is a flowchart illustrating machine readable instructions which may be executed to implement the weld training system of FIGS. 1 and/or 2.

FIG. 3 is a flowchart illustrating machine readable instructions 300 which may be executed to implement the weld training system 100 of FIGS. 1 and/or 2. For example, the instructions 300 may be executed by the processor 210 to collect images and data for a welding operation (e.g., real or simulated), synchronize the images and data, and display the synchronized images and data for presentation and/or navigation by a user.

At block 302, the welding-type equipment 106, the welding sensor(s) 114, and the camera(s) 110, 112 for monitoring a welding-type operation are initialized. For example, the weld training system 100 may initialize the cameras 110, 112 and/or the sensor(s) 114 in response to determining that the welding equipment 106 is powered on and/or ready to be used.

At block 304, the weld training system 100 collects data describing the welding-type operation from the welding equipment 106 and/or from the sensor(s) 114 during the welding-type operation. The data describing the welding-type operation may include a weld variable such as a weld voltage, a physical weld parameter, an electrical weld parameter, a weld current, a contact-tip-to-work distance, an arc length, an energy input, a torch travel speed, a torch orientation, and/or a measured bead width. In some examples, the weld training system 100 collects one or more types of data describing the weld from images collected by the camera(s) 110, 112, such as the measured bead width.

At block 306, the weld training system 100 collects first images of the operator 108 performing the welding-type operation. The first images may be collected from the first camera 110 that has a viewpoint of the posture of the operator and/or a technique of the operator 108. For example, the first images may depict the operator's entire body and/or a top half of the operator's body.

At block 308, the weld training system 100 collects second images of the welding torch 104 used in the welding-type operation from the second camera 112. For example, the second images may depict more detail about the orientation and/or travel speed of the torch 104 during the welding-type operation.

At block 310, the weld training system 100 collects third images of the weld bead generated by the welding-type operation. For example, the third images may be captured by a third camera focused on the weld puddle and/or weld bead and/or may be captured by the second camera 112 using additional processing and/or zooming to capture the weld bead in addition to capturing the second images of the torch 104. Any of the first images, the second images, and/or the third images may capture or represent light wavelengths outside of the visible wavelength spectrum.

At blocks 304, 306, 308, and 310 the weld training system 100 receives the data and/or the images including time information (e.g., timestamps). In other examples, the weld training system 100 timestamps the received data and/or images based on the times at which the data points and/or images were received at the weld training system 100.

At block 312, the weld training system 100 determines whether the welding-type operation is completed. If the welding-type operation is not completed (block 312), control returns to block 304 to continue collecting data and/or images.

When the welding-type operation is completed (block 312), at block 314 the weld training system 100 synchronizes the data, the first images, the second images, and the third images. For example, the weld training system 100 may match up data points, the first images, the second images, and the third images based on the timestamps associated with the data and the images. In some examples, the weld training system 100 associates the weld data to respective locations on the workpiece by determining locations of a weld puddle during the welding-type operation (e.g., based on image analysis, based on feedback from the weld torch 104, or any other method of detecting location) and associating the locations of the weld puddle to the weld data points captured during the welding-type operation.

At block 316, the weld training system 100 displays the data, the first images, the second images, and the third images via weld training interface. The display of the data, the first images, the second images, and the third images via weld training interface may include presenting a split screen configuration. For example, the processor 210 and/or the GPU 218 may control the display device 222 to display a graph of the weld data with at least one axis of the graph corresponding to the weld bead or the time duration of the welding-type operation. The graph may also include a range of acceptable values for the data in the graph, where the graph visually indicates any data points which are outside of the range of acceptable values. The processor 210 and/or the GPU 218 may control the display device 222 to simultaneously display the first, second, and third images in different portions of the display device 222. Examples of the weld training interface is described below with reference to FIGS. 5, 6A, and 6B.

At block 318, the weld training system 100 determines whether an input specifying a portion of the welding-type operation has been received via the weld training interface. For example, the input may be received via the user interface component(s) 207 and/or the interface device 116. Example inputs include selection of a particular time point during the welding-type operation via a timeline, selection of one or more weld data points on a visualization of the weld data points (e.g., a graph of weld data over the time that permits selection of the graphed data), and/or a selection of any of the first images, the second images, and/or the third images.

If the input has not been received (block 318), control loops to block 318 to await the input. When the input is received (block 318), at block 320 the weld training interface displays corresponding synchronized portions of the data, the first images, the second images, and the third images based on the input.

For example, if a user selects a weld data point, one of the first images, one of the second images, and one of the third images having timestamps corresponding to the timestamp of the selected weld data point are displayed on the weld training interface. This may allow, for instance, a user to select a weld data point outside of a particular range for the corresponding parameter to view the weld bead, the welding equipment, and/or the operator's posture at and/or near the time that the weld data point occurred, which may provide to the user a reason for the weld data point being outside of the range.

Additionally or alternatively, the user may slide a time indicator along a timeline to view the first images, the second images, and/or the third images at different times during the welding-type operation, while a graph of the weld data indicates the value of the weld data points corresponding to the images being viewed at any particular time. If the user spots an unusual aspect of the weld bead, the weld equipment, and/or the operator's posture, the user may easily see how that aspect affected other elements of the welding-type operation (e.g., how the operator's posture affected the contact tip to work distance, the weld bead, and/or the weld data).

Figure 4A:
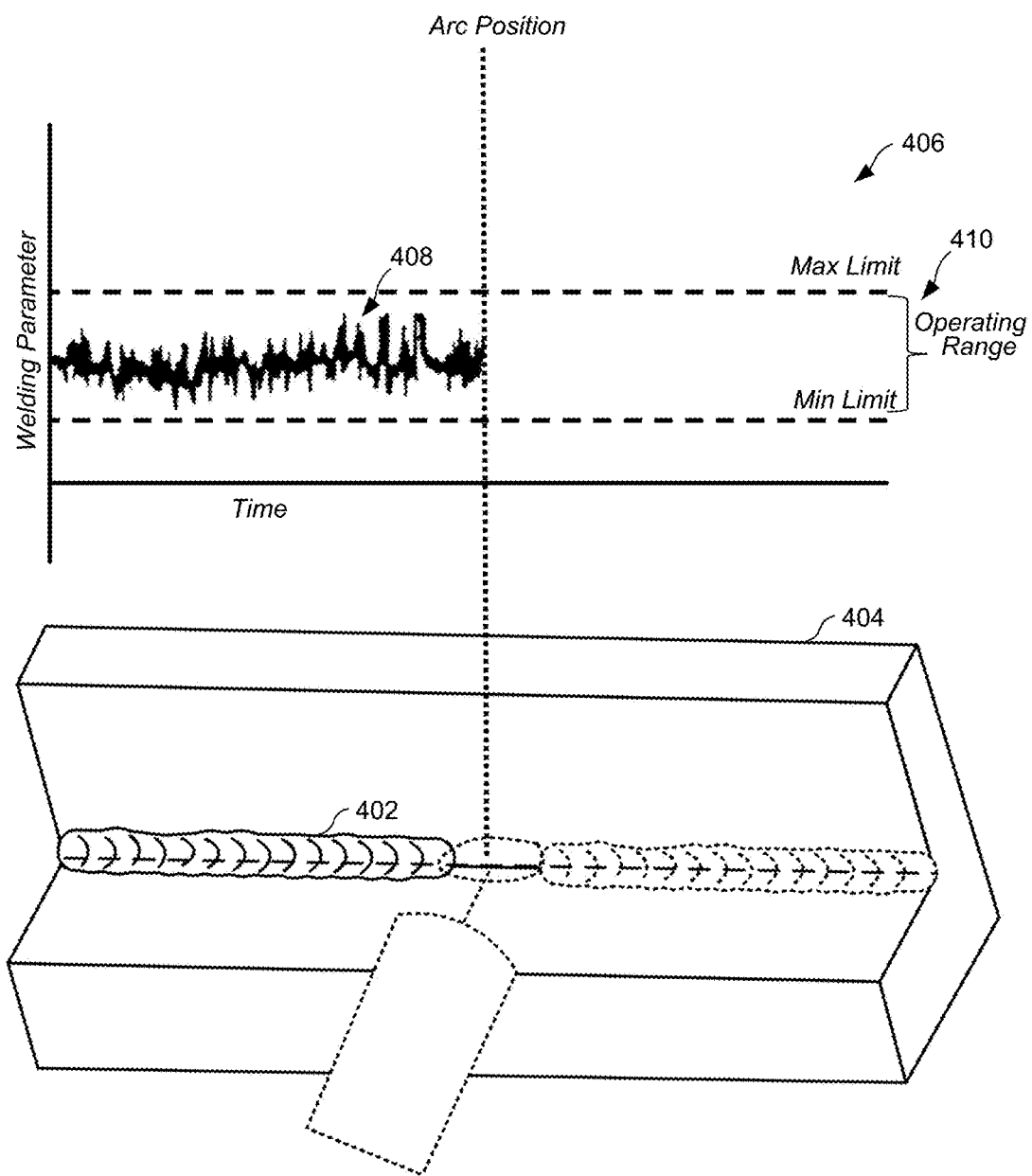
FIG. 4A depicts an example synchronization of weld data and first images captured during a welding operation.
Figure 4B:
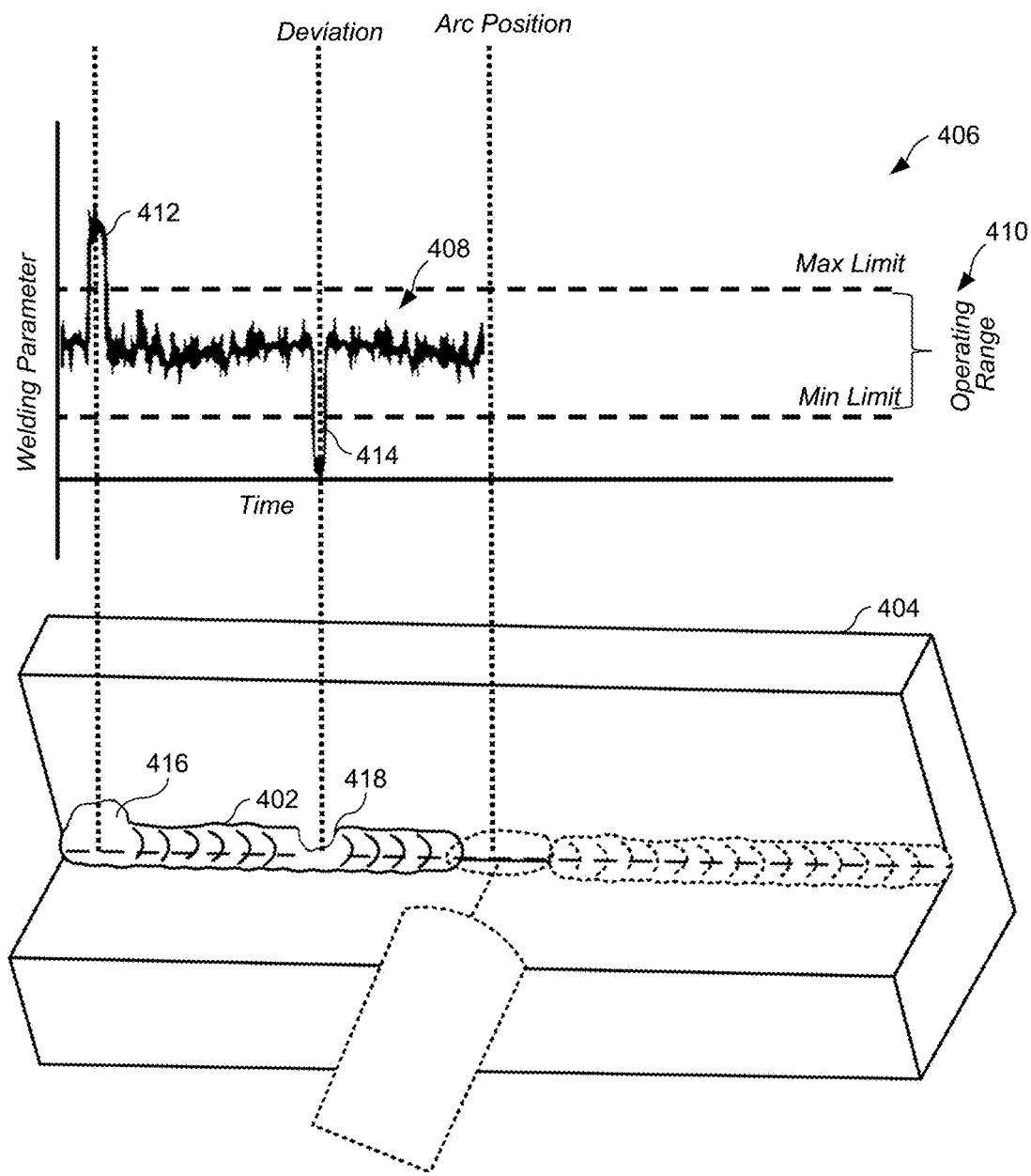
FIG. 4B depicts another example synchronization of weld data and first images captured during a welding operation, including identification of weld data deviations and/or weld defects.

FIGS. 4A and 4B illustrate a weld training user interface's display of a real-time welding operation data and corresponding images and a corresponding coupon, where deviations in a given welding parameter can result in defects and/or other anomalies. As illustrated, a defect can occur when a welding parameter falls outside of (e.g., deviates from) an acceptable operating range, which may be defined by maximum and/or minimum limits. To assist the weld operator 108 in identifying and preventing such deviations, the weld training user interface may display and monitor the welding parameters in real-time. The weld training user interface may be displayed via the weld training system 100, the interface device 116, and/or via another monitor, such as a remotely or adjacently situated monitor. Further, as the weld operator 108 manipulates the welding torch, the weld training user interface may alert the weld operator 108 to the potential deviation as described above. For example, if the weld operator's 108 travel speed is approaching the maximum limit, the weld training user interface may sound an alarm or provide a visual to cue the weld operator 108 to reduce speed. With reference to FIG. 4A, an example welding parameter is graphed in relation to a weld bead 402 on a weld specimen 404. As illustrated in the graph 406, the welding data 408 resides within a defined operating range 410. According, no defects are displayed or anticipated in the weld bead 402 of the weld specimen 404. With reference to FIG. 4B, however, it is apparent that the welding parameter deviated from the operating range in at least two instances 412, 414. Accordingly, two defects 416, 418 are provided in the weld bead of the weld specimen 404. Thus, the welding data 408 may be collected, stored, and synchronized with points along the weld bead 402 such that a user can identify the causes of a selected defect 416, 418. As will be described below, physical characteristics of the weld bead 402 may also be measured (e.g., when a real world weld is formed), stored, and synchronized with a corresponding position on the weld bead. Likewise, the weld operator 108 may select a data point on the graph 406 to display the resultant weld bead (or portion thereof), the weld operator's 108 posture, other welding parameters, welding settings, etc. In other words, the various data and/or displays of a combination display may be synchronized, where the user can select points in time for further analysis based upon, for example, a point along the weld bead, a data point on a graph, a particular posture, or combination thereof.

In some examples, synchronization may include aligning and/or scaling a representation of the weld data (e.g., a graph) and/or the captured images of the weld bead on the display device 222 so that the graph and the weld bead are depicted to have a substantially equal length. Additionally or alternatively, the representation of the weld data may be aligned and/or scaled with the images of the weld operator's posture and/or technique, and/or the images of the weld torch.

In one example, the torch angle and travel speed of a torch, as a non-limiting illustrative set of welding parameters, may be tracked in real-time. Combining the torch angle with the travel speed enables the weld operator 108 to identify (or predict) where a defect may be within the weld. The defect may be displayed via the weld training user interface. The defects may be further annotated with the probable cause of the defect. For example, the defect may be selected (or hovered over) to display that it resulted from a travel speed deviation. In virtual environments, the visual appearance of the defect may be generated to match a defect expected from the specific travel speed deviation. In real world welding environments, the appearance of weld bead may be the actual weld bead. While torch angle and travel speed are used in this example, other welding parameters may be monitored. Further, one of more welding parameters, or other welding operation data, may be used to create a composite score, which may be similarly used to identity and/or predict defects.

In some examples, the weld training system 100 may leverage additional processing capabilities to improve the analysis of the welding-type operation to further enhance the operator's learning. For example, the weld training system 100 may provide the data, the first images, the second images, and/or the third images to a neural network to identify weld anomalies in the welding-type operation. The weld training system 100 may then display the corresponding synchronized portions of the data, the first images, the second images, and the third images with identifiers that indicate the weld anomalies identified by the neural network.

In some examples, the weld training system 100 stores the weld data, the first images, the second images, and the third images in a storage device such as the memory 211 during the welding-type operation. The weld training system 100 associates the data and one or more of the first images, the second images, and/or the third images a weld defect type and/or a weld defect cause. For example, observed weld data may be correlated to known weld defect types and/or weld defect causes as described in U.S. Pat. No. 9,498,852 (Albrecht), issued Nov. 22, 2016. The entirety of U.S. Pat. No. 9,498,852 is incorporated herein by reference. In response to a selection of a weld defect type in the weld bead and/or a weld defect cause, the weld training system displays the data and the one or more of the first images, the second images, or the third images via the display device 222. A user may access the weld training system 100 to identify one or more specific types of weld defects and/or specific causes of weld defects to determine whether any such types and/or causes of weld defects were present in a completed welding-type operation.

The example interfaces illustrated in FIGS. 4A and/or 4B may be shown in real-time and/or at the conclusion of the welding-type operation.

Figure 5:
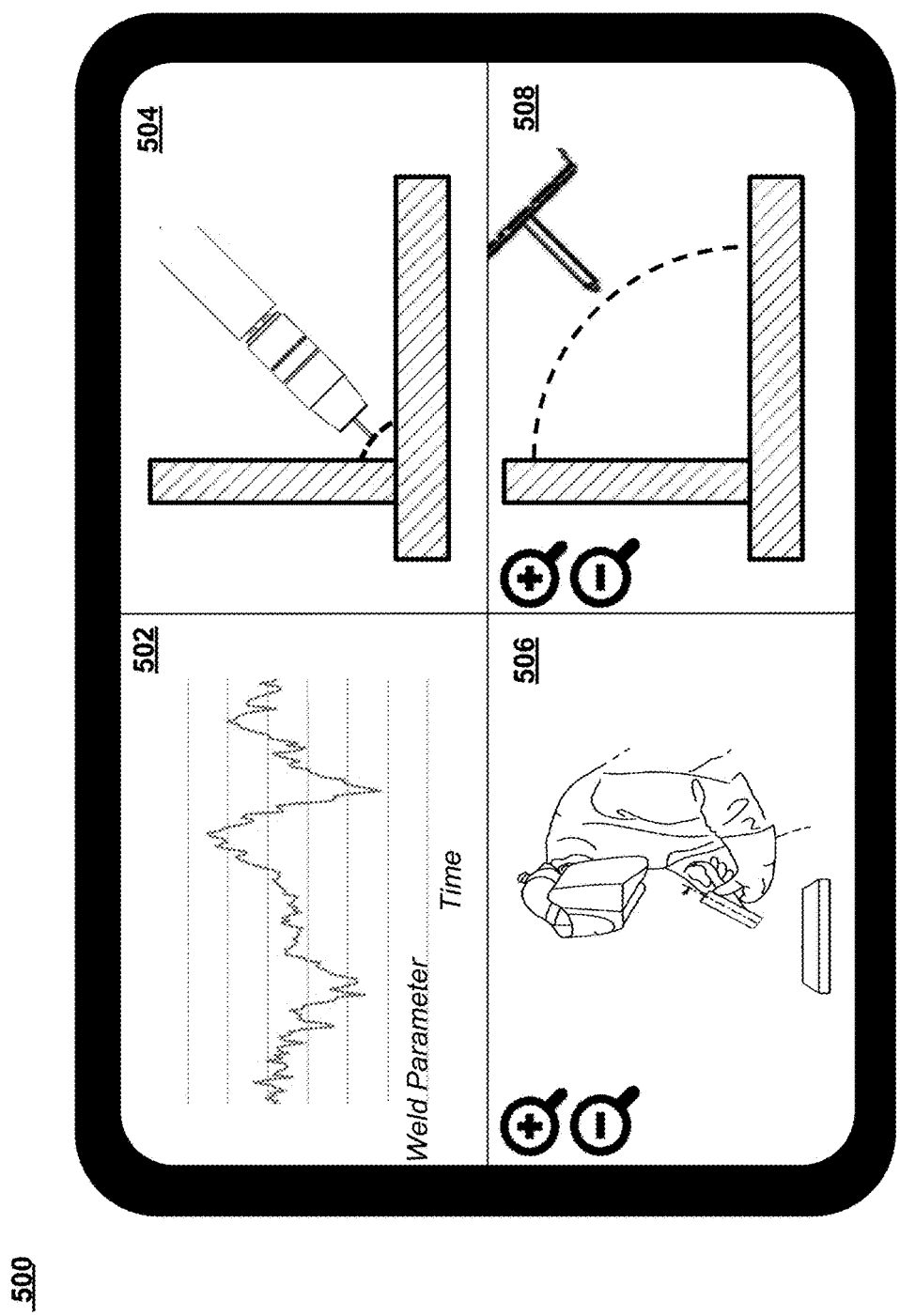
FIG. 5 depicts a synchronized display of weld data and images from multiple cameras during a welding operation that have been synchronized.

FIG. 5 illustrates a combination display 500 of synchronized real-time welding parameters alongside views of the weld operator 108 and a corresponding augmented reality coupon. The combination display may be displayed via the weld training system 100 or via another monitor. The weld training user interface's combination display may be displayed as a graphical user interface (GUI) via an electronic user device, such as a laptop, tablet computer, smart phone, fixed display, or the like. In certain aspects, the electronic user device's existing hardware may be used to gather data. For example, the electronic user device may be configured with a three dimensional camera, or other sensing devices, whether visual, auditory, or otherwise. The electronic user device may be fixed on torch or work station. The electronic user device may be mobile, where it can be attached to the weld operator 108 as part of the helmet, or as part of the welding machine, wire feeder/robot GUI. The electronic user device may receive information from the welding system using one or more wireless communication technologies, including, for example, Bluetooth, Wi-Fi, near field communication (NFC), ZigBee, etc. The combination display provides the weld operator 108 with various guiding references, including, for example, a real-time graph 502 of one or more welding parameters, a real-time weld view 504 of the weld bead of the weld specimen 404, a real-time posture view 506 of the weld operator's 108 posture, and a zoomable real-time view 508 of the weld torch 104. The combination display may be customizable such that only certain of the displays are provided at a given time. As a result, a weld operator 108 may review the graphs and images on a single display to increase learning, but any true correction may be enhanced when the instructor and the weld operator 108 display images synchronized to the weld data.

The real-time graph 502 may illustrate one or more welding parameters or a composite score, which takes into account one or more welding parameters. In certain aspects, multiple real-time graphs 502 may be provided. For example, certain of the real-time graphs 502 may display individual welding parameters or operating conditions, while other real-time graphs 502 may display a composite of one or more welding parameters or operating conditions. One or more position sensors positioned on the weld operator 108 or the weld training system 100 may be used to determine the posture of the weld operator 108, and/or images of the posture of the operator may be captured by one or more cameras for direct display in the posture view 506. Thus, the posture of the weld operator 108 may be monitored and stored throughout the welding operation.

The image of the weld specimen 404 may be displayed, which may be zoomable, rotatable, and/or panable. For example, the image of the weld specimen 404 may move in real-time to correspond with movements of the weld specimen 404, or may be manually repositioned (e.g., via pan, rotate, and zoom icons) by the weld operator 108 where the image is rendered based on stored information (e.g., generated mechanical/CAD data), thereby providing instructors with the ability to examine the final product after the operation is complete. Multiple cameras may be employed to provide various views or angles. For example, based on signals received from the IMU sensors, the combination display may display the position of the weld operator 108's feet, the weld operator 108's center of gravity, overall posture, etc. The IMU sensors may be positioned to track movement across the weld operator 108's body, the torch, the weldment, the robot, or another component of the welding system, thereby enabling tracking of body posture, torch, weldment, and/or robot position. In another aspect, other sensors 114 may be employed.

Figure 6A:
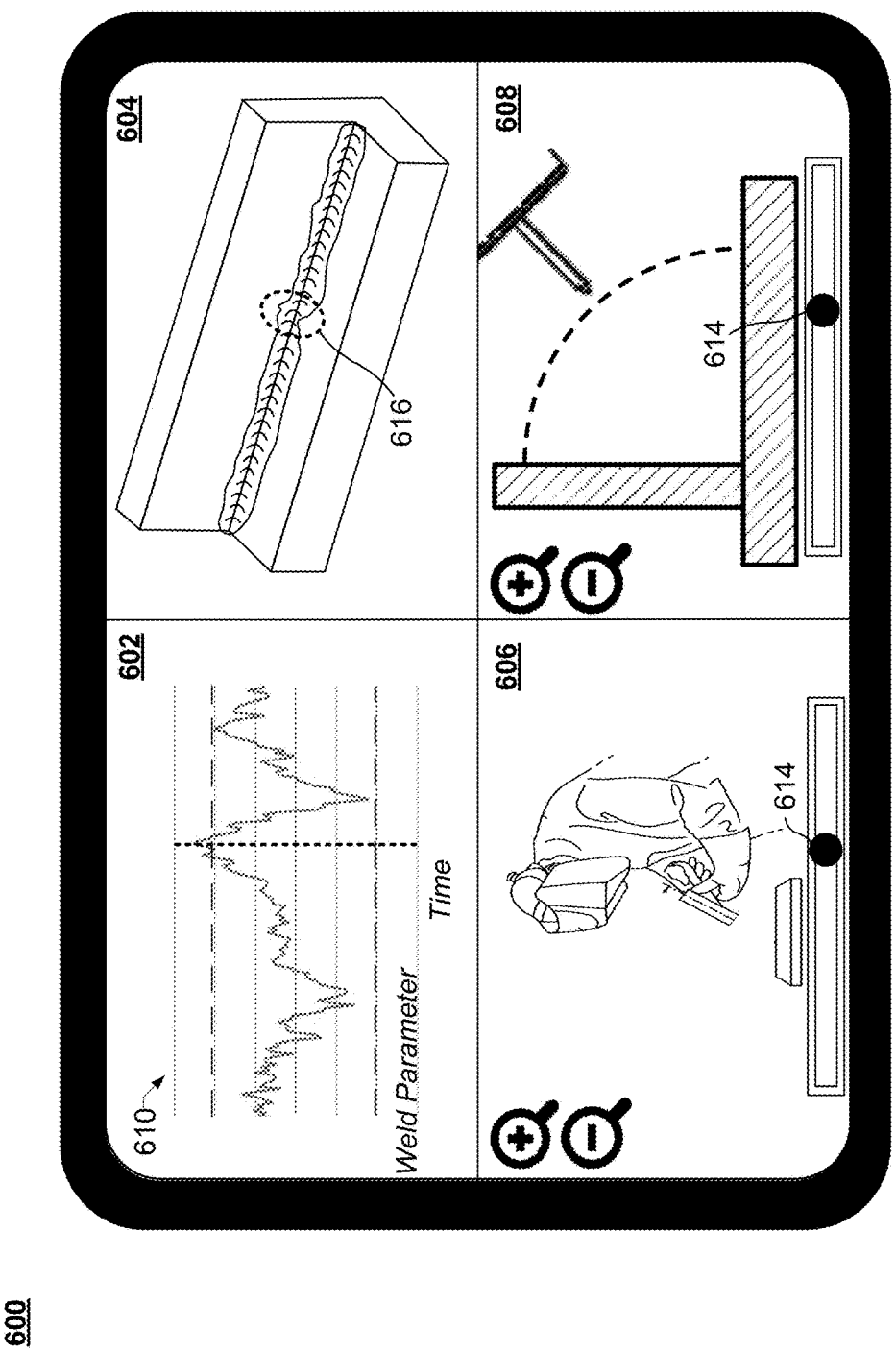
FIGS. 6A and 6B illustrate an example weld training user interface display of welding data synchronized with images of the welding operation, where different portions of the weld data and/or images are selected.
Figure 6B:
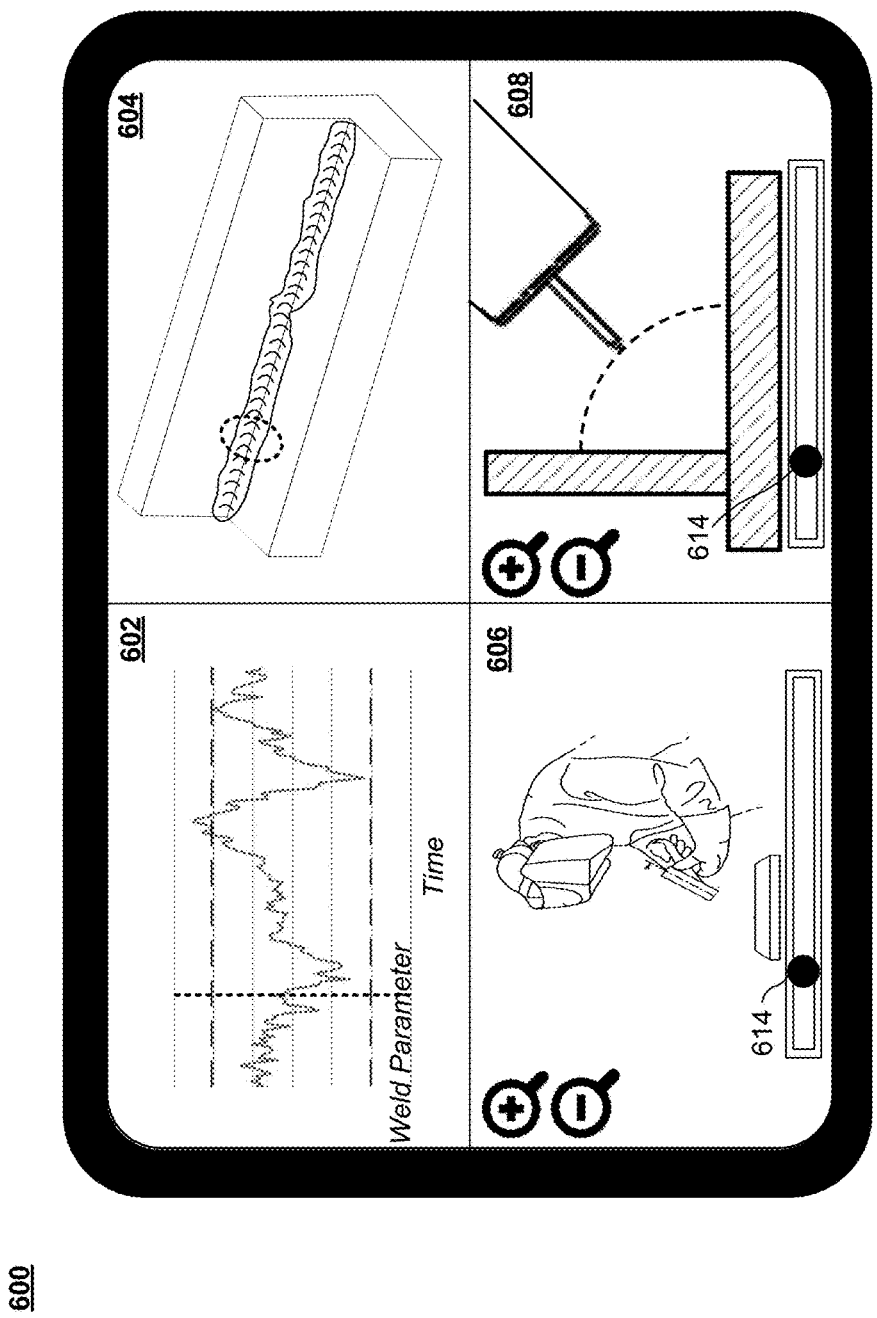

FIGS. 6A and 6B illustrate an example weld training user interface display 600 of welding data 602 synchronized with images 604, 606, 608 of the welding operation, where different portions of the weld data and/or images are selected. The displayed welding data 602 and the images 604, 606, 608 are presented in a split-screen format, in which each of the welding data 602 and the images 604, 606, 608 occupies a section of the display 600. The welding data 602 is presented in a representative form, such as in a graph 610.

The examples of FIGS. 6A and 6B may be implemented as a playback mode on the welding training user interface. For example, the weld operator 108 and/or instructor may select one or more positions on the graph 610 and/or points along a weld bead 612 to display the various welding operation data 602 and collected data at the selected point in time 614. The images and data may be synchronized. That is, if a defect 616 is selected, the weld training user interface may display the posture of the weld operator 108 and/or one or more welding parameters at that point (e.g., at the time 614) during the welding operation. For example, the weld operator 108 and/or instructor may conclude that the defect resulted from poor posture and an exceedingly fast travel speed. Using this information, the weld operator 108 may learn to, in the future, improve such posture and to reduce travel speed. The various welding parameters and collected data may also be stored for later analysis, or exported and sent for expert analysis. Using the data, the expert may identify the causes of defects or other issues, which may be derived from the welding parameters, posture, video, etc.

When a real weld bead is created, the weld bead's characteristics may be analyzed using one or more techniques, such as scanning, visual observation, x-ray, ultrasonic, die penetrant, mechanical testing, and weld bead location/shape. The weld bead's characteristics may also be synchronized with the video and graphs, thereby providing the weld operator 108 with any correlations welding parameters/posture and resultant characteristics.

In some examples, the monitored weld operation may be set as the "correct" or "expert" example of performance of the weld operation, against which future training welds can be compared. The example weld training system 100 then saves the synchronized data and/or images to a storage device for subsequent retrieval. The weld training system 100 may further associate tags or metadata with the stored data and/or images to enable locating the data and/or images based on a problem. For example, weld data and images may be associated with creating correct fill, and would be identified in response to a user request at the weld training system 100 for training data representative of a lack of fill during a welding operation.

The weld training system 100 may display the corresponding synchronized portions of the data, the first images, the second images, and/or the third images at normal speed, in slow motion, and/or at accelerated speed.

In some examples, the sensors 114 of FIGS. 1 and/or 2 capture audio from a welding-type operation and the weld training system 100 synchronizes the audio with the image(s) and/or the weld data. When the weld data and/or the image(s) are selected via the weld training system 100, a portion of the audio captured near the time point of the selected weld data or image may be played to provide additional auditory feedback to the user. In some such examples, the weld training system 100 enables the user to select a portion of the audio. For example, the weld training user interface may display a graph of a representative waveform of the audio that is synchronized to the weld data and/or the images. The audio waveform visualization enables a user to select a portion of the audio (e.g., based on the audio waveform having a visually-observable anomaly), which causes the weld training user interface to display the weld data and/or image(s) of the operator 108, the weld torch 104, and/or the weld bead from the same time or time period.

An alternative to displaying a captured or simulated image of the weld bead includes displaying a representation of the weld bead, such as the voltage or current. For example, the welding training system 100 may process the collected data to generate a representation of the weld bead generated by the welding-type operation and display the representation, such as a graph of one or more parameters and/or of the result of a model using one or more parameters. Like the image of the weld bead, the representation may be synchronized to the collected data and/or to other captured images.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A weld training system, comprising:
    a display device;
    a processor; and
    a machine readable storage device comprising machine readable instructions which, when executed, cause the processor to:
        collect, from welding-type equipment during a welding-type operation, data describing the welding-type operation;
        collect, from a set of one or more cameras, first images of an operator performing the welding-type operation, the first images depicting a posture of the operator or a technique of the operator;
        collect, from the set of one or more cameras, second images of a welding torch used in the welding-type operation;
        collect third images of a weld bead generated by the welding-type operation;
        synchronize the data, the first images, the second images, and the third images;
        identify an anomaly associated with the data;
        simultaneously display the data, the first images, the second images, and the third images, the displaying comprising displaying an indicator of the anomaly in at least one of the data, the first images, the second images, and the third images; and
        after the welding-type operation and in response to an input specifying a portion of the welding-type operation, simultaneously display corresponding synchronized portions of the data, the first images, the second images, and the third images to present a relationship between the posture of the operator, a position of the welding torch, and the data to the weld bead.

2. The weld training system as defined in claim 1, wherein the welding-type operation is a simulated weld, and the third images of the weld bead are simulated images.

3. The weld training system as defined in claim 1, wherein the welding-type operation is an actual weld.

4. The weld training system as defined in claim 3, wherein the third images of the weld bead are collected from the set of one or more cameras.

5. The weld training system as defined in claim 1, wherein the input comprises a selection of a time, a selection of the data, a selection of any of the first images, a selection of any of the second images, or a selection of any of the third images.

6. The weld training system as defined in claim 1, wherein the instructions further cause the processor to capture audio from the welding-type operation.

7. The weld training system as defined in claim 6, wherein the input comprises a selection of a portion of the audio.

8. The weld training system as defined in claim 1, wherein one or more of the first images, the second images, or the third images represents light wavelengths outside of the visible wavelength spectrum.

9. The weld training system as defined in claim 1, wherein the instructions cause the processor to display the data in a graph.

10. The weld training system as defined in claim 1, wherein the instructions cause the processor to associate the data to respective locations by determining locations of a weld puddle during the welding-type operation and associating the locations of the weld puddle to at least one data point captured during the welding-type operation.

11. The weld training system as defined in claim 1, wherein the data describing the welding-type operation comprises at least one of a weld variable, a physical weld parameter, or an electrical weld parameter, the instructions to cause the processor to display a graph of the data, at least one axis of the graph corresponding to the weld bead.

12. The weld training system as defined in claim 11, wherein the weld variable is a weld voltage, a weld current, a contact-tip-to-work distance, an arc length, an energy input, a torch travel speed, a torch orientation, or a measured bead width.

13. The weld training system as defined in claim 11, wherein the instructions cause the processor to display with the graph a range of acceptable values for the data in the graph, the graph to visually indicate any data points which are outside of the range of acceptable values.

14. The weld training system as defined in claim 1, wherein the instructions cause the processor to display the corresponding synchronized portions of the data, the first images, the second images, and the third images in a split-screen configuration on the display device.

15. The weld training system as defined in claim 1, wherein the weld training system is integral with the welding-type equipment.

16. The weld training system as defined in claim 1, wherein the weld training system is to receive the data from the welding-type equipment via at least one of a wireless communication or a wired communication.

17. A weld training system, comprising:
a display device;
a processor; and
a machine readable storage device comprising machine readable instructions which, when executed, cause the processor to:
collect, from welding-type equipment during a welding-type operation, data describing the welding-type operation;
collect, from a set of one or more cameras, first images of an operator performing the welding-type operation, the first images depicting a posture of the operator or a technique of the operator;
collect, from the set of one or more cameras, second images of a welding torch used in the welding-type operation;
collect third images of a weld bead generated by the welding-type operation;
synchronize the data, the first images, the second images, and the third images;
simultaneously display the data, the first images, the second images, and the third images;
after the welding-type operation and in response to an input specifying a portion of the welding-type operation, simultaneously display corresponding synchronized portions of the data, the first images, the second images, and the third images to present a relationship between the posture of the operator, a position of the welding torch, and the data to the weld bead;
store the data, the first images, the second images, and the third images in a storage device;
associate the data and one or more of the first images, the second images, or the third images with at least one of an anomaly type or an anomaly cause; and
in response to a selection of the at least one of the anomaly type in the weld bead or the anomaly cause, display the data and the one or more of the first images, the second images, or the third images via the display device.

18. The weld training system as defined in claim 1, wherein the instructions further cause the processor to align and scale a representation of the data with at least one of the first image, the second images, or the third images on the display device.

19. The weld training system as defined in claim 1, wherein the instructions cause the processor to display the corresponding synchronized portions of the data, the first images, the second images, and the third images in slow motion or at accelerated speed.

20. A weld training system as defined in claim 1, wherein the instructions further cause the processor to
a display device;
a processor; and
a machine readable storage device comprising machine readable instructions which, when executed, cause the processor to:
collect, from welding-type equipment during a welding-type operation, data describing the welding-type operation;
collect, from a set of one or more cameras, first images of an operator performing the welding-type operation, the first images depicting a posture of the operator or a technique of the operator;
collect, from the set of one or more cameras, second images of a welding torch used in the welding-type operation;
collect third images of a weld bead generated by the welding-type operation;
synchronize the data, the first images, the second images, and the third images;
simultaneously display the data, the first images, the second images, and the third images;
after the welding-type operation and in response to an input specifying a portion of the welding-type operation, simultaneously display corresponding synchronized portions of the data, the first images, the second images, and the third images to present a relationship between the posture of the operator, a position of the welding torch, and the data to the weld bead;
provide one or more of the data, the first images, the second images, or the third images to a neural network to identify weld anomalies in the welding-type operation; and
display the corresponding synchronized portions of the data, the first images, the second images, and the third images with identifiers to indicate the weld anomalies identified by the neural network.

21. The weld training system as defined in claim 1, wherein the instructions further cause the processor to:
collect weld torch position information during the welding-type operation;
synchronize the weld torch position information to one or more of the data, the first images, the second images, or the third images; and
after the welding-type operation, determine the position of the welding torch with respect to the weld bead to determine the portion of the welding-type operation to be displayed via the data, the first images, the second images, or the third images.

22. The weld training system as defined in claim 1, wherein the corresponding synchronized portions of the data, the first images, the second images, and the third images represent a time period during which specified portion of the welding-type operation occurred.

* * * * *